United States Patent [19]

Satomoto

[11] 4,386,732

[45] Jun. 7, 1983

[54] THERMALLY RESPONSIVE VALVE ASSEMBLY

[75] Inventor: Atsushi Satomoto, Toyota, Japan

[73] Assignee: Aisin Seiki Kabushiki Kaisha, Kariya, Japan

[21] Appl. No.: 244,907

[22] Filed: Mar. 18, 1981

[30] Foreign Application Priority Data

Mar. 25, 1980 [JP] Japan .......................... 55-39761[U]

[51] Int. Cl.³ ............................................ G05D 23/10
[52] U.S. Cl. .................................. 236/48 R; 236/87; 236/101 C
[58] Field of Search .................... 236/48 R, 87, 101 C

[56] References Cited

U.S. PATENT DOCUMENTS

| | | | |
|---|---|---|---|
| 4,142,676 | 3/1979 | Hattori | 236/87 |
| 4,182,485 | 1/1980 | Kitamura | 236/48 R |
| 4,239,152 | 12/1980 | Kitamura et al. | 236/48 R |
| 4,239,154 | 12/1980 | Inada et al. | 236/87 |
| 4,247,041 | 1/1981 | Kitamura et al. | 236/48 R |
| 4,322,032 | 3/1982 | Hashimoto et al. | 236/48 R |

*Primary Examiner*—William E. Tapolcai
*Attorney, Agent, or Firm*—Oblon, Fisher, Spivak, McClelland & Maier

[57] ABSTRACT

A thermally responsive valve assembly having two ports and a valve mechanism interposed between the ports. The assembly employs a bimetallic element assembly including a pair of dish-shaped bimetallic elements of different thermally responsive character. Both bimetallic elements are connected each other so that a snap length of one of the bimetallic elements is cancelled by a snap length of the other bimetallic element at a predetermined temperature. The former bimetallic element is operatively connected to the valve mechanism so that the valve assembly can restore its former position as the temperature is being increased and provide a series of three modes of operation in successive steps on an increasing degree of temperature.

2 Claims, 3 Drawing Figures

THERMALLY RESPONSIVE VALVE ASSEMBLY

BACKGROUND OF THE INVENTION

Field of the Invention

This invention relates to a dual thermal function valve in corporating bimetallic elements as actuating means and useful for instance in an automotive engine exhaust gass recirculating system.

Description of the Prior Art

Various thermally actuated valves have been used particularly for automotive applications. These valves have proven successful but still these valves have been unsatisfactory for certain applications for want of multiplicity of modes of operation.

Accordingly, it is an object of this invention to provide an improved thermally responsive multi-function valve in which functions can be switched accurately in sequence at different predetermined temperatures so that the valve restores its former position in successive steps upon an increasing degree of temperature.

It is also another object of the invention to provide a thermally responsive valve which may be used as a quantity adjusting valve mechanism for fluid flow.

SUMMARY OF THE INVENTION

The foregoing objects and others are attained according to at least one aspect of provision of a bimetallic element assembly comprising a pair of dish-shaped bimetallic elements of different thermally responsive character, snapping lengths of the bimetallic elements being cancelled each other at a predetermined temperature.

The thermal function valve of this invention therefore comprises a valve body having two ports, a valve mechanism in the body interposed between the ports and including a seat and a valve member for closing and allowing communication between the ports, a pair of first and second dish-shaped bimetallic elements in side by side relation with each other, said second bimetallic element having a central hole, a spacer member having a central hole and a bead edge, said spacer member being interposed between the both bimetallic elements in concentric relation with the both bimetallic elements, transfer pin means operatively connecting the first bimetallic element to the valve member by freely passing through the central hole of the second bimetallic element and the central hole of the spacer member, a first anchoring member surrounding the transfer pin means in a freely movable condition for providing an anchoring means for the second bimetallic element around the central hole of the second bimetallic element, and a second anchoring member providing a second anchoring means for the second bimetallic element outside of the first anchoring member in the same side of the second bimetallic element. Snaps of the bimetallic elements cancel each other at a predetermined temperature to thereby cause the valve to restore its former position at a different temperature as the temperature is increasing.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
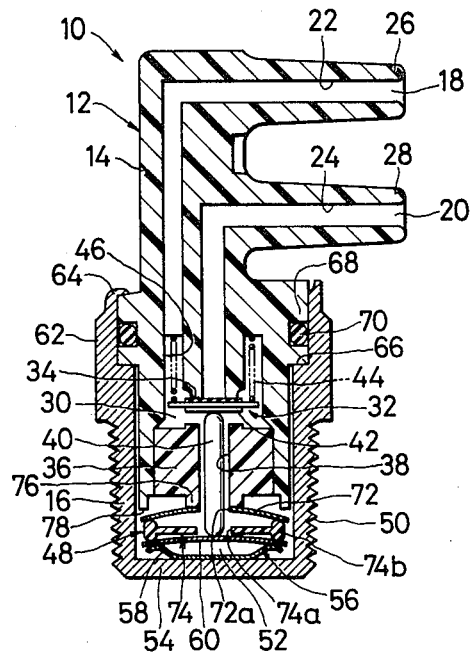
FIG. 1 is an axial sectional view of a dual thermal function valve according to the invention.

Referring now to the drawings, a dual function thermally responsive valve assembly 10 of this invention has a two-part generally cylindrical valve body 12 comprising a first valve part 14 and a second valve part 16. The first valve body part 14 as shown in FIG. 1 has first and second ports 18 and 20 which open generally perpendicular to the main axis of the body part 14. The two ports 18 and 20 each have central bores 22 and 24 respectively which run the entire length of the ports and respective external nipple portions 26 and 28. First valve part 14 and ports 18 and 20 are preferably made from one piece of material such as glass-filled nylon. Port 18 is typically open to atmosphere while port 20 is typically connected with tubing (not shown) which runs between valve 10 and a vacuum or vent sources such as intake manifolds of vehicle engines.

Central bores 22 and 24 all connect with a central chamber or cavity 30 within first valve part 14. Bore 22 leads directly into cavity 30 whereas bore 24 leads into cavity 30 across a valve mechanism 32. The outlet of bore 24 functions as the valve seat 34 for valve assembly 10 to be discussed further below.

Anchored within cavity 30 as by press fitting is a bushing 36 having an axially extending bore 38 running through its entire length. The bore 38 serves to maintain proper alignment of a transfer pin 40 to be discussed below. Bushing 36 may be made from glass-filled nylon similar to the material for first valve part 14. The valve mechanism has a valve member 42 having a lining on its face adjacent to seat 34 as usual to provide a better sealing ability.

Figure 2:
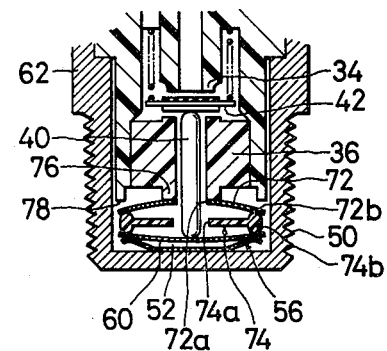
FIG. 2 is a similar view to FIG. 1, but showing a part of the valve of FIG. 1.

A coil spring 44 shown in FIG. 1 at one end fits over tubular portion 46 at the opening of the central bore 24 into cavity 30 and at the other end rests on an edge of valve member 42. Spring 44 serves to bias valve member 42 and hence correspondingly transfer pin 40 downward as shown in FIG. 2. Spring 44 has a predetermined spring constant which is compatible with the snap-force of a bimetallic element to be discussed further below.

The second valve body part 16 is shown to comprise a cup-shaped member adapted to be sealingly secured to first body part 14. More particularly second body part 16 comprises a member of thermally conductive material such as a brass having a hollow externally threaded portion 50 and central cavity 52 with preferably a flat bottom with a supporting spring member 56 disposed therein. The supporting spring member 56 has a circular central portion from which a plurality of resilient tongues 58 radially extend for supporting a first bimetallic element 60 at its peripheral edge to be further described below.

Accordingly, body part 16 has a hexagonal shaped portion 62 enabling the valve assembly 10 to readily be inserted in a threaded hole and also a relatively thin wall 64 extending upwardly from the hexagonal shaped portion 62. A shoulder 66 is formed at the junction of wall 64 with the remainder of portion 62 and against a circular portion 68 of body part 14 bears when the two body parts 14 and 16 are assembled. A sealing gasket 70 is disposed in a notched portion of body part 14 and is compressed when the wall 64 is rolled over to sealingly secure the two valve portions together to form valve body 12.

As best shown by FIG. 1 bimetallic assembly 48 comprises another bimetallic member 72 and a ring form spacer member 74. The bimetallic assembly 48 is captive in cavity 52 within second valve part 16. Bimetallic element 72 rests on a peripheral annular projection edge 74b of spacer member 74 at the circumferential edge and the spacer 62 in turn rests on first bimetallic element 60 at the circumferential edge. The alignment of both bimetallic elements, spacer member 74 and spring member 56 is maintained by the internal face of second valve part 16. Central holes of bimetallic element 72 and spacer member 74 respectively numbered as 72a and 74a are of a diametric size just large enough to allow free movement of transfer pin 40, therethrough.

The bushing 36 is provided with a central, circular projection or anchor 76 at the outlet of the bore 38 on which anchors the second bimetallic element 72 in the position shown in FIG. 1. The first body part 14 has its lowermost circular edge or anchor 78 disposed adjacent to the peripheral edge of the second bimetallic element 72 to be described further below so as to anchor the second bimetallic element 72. Dish-shaped bimetallic elements 60 and 72 each have one layer of metal of a low thermal coefficient of expansion and another layer of metal of somewhat higher thermal coefficient of expansion so that at respective predetermined temperatures the elements will snap over center to an inverter dish-shaped configuration. The metal materials and the amount of preforming or dishing for the two bimetallic elements 60 and 72 are chosen such that the two snap over center at different temperatures and spacer element 74 is movable in conformity with snap over motion of bimetallic elements 60 and 72. The two dish-shaped elements 60 and 72 are preferably positioned in the cavity so as to have an initial concave upward orientation with the low expansion side of the material facing upward in the view. The bimetallic assembly 48 formed of bimetallic elements 60 and 72 has a first position shown in FIG. 1 when both first and second elements 60 and 72 are positioned concave upward as shown in FIG. 1, a second position when first bimetallic element 60 is concave downward and second element 72 is concave upward as shown in FIG. 2 and a third position when second bimetallic element 72 is also concave downward as shown in FIG. 3.

Figure 3:
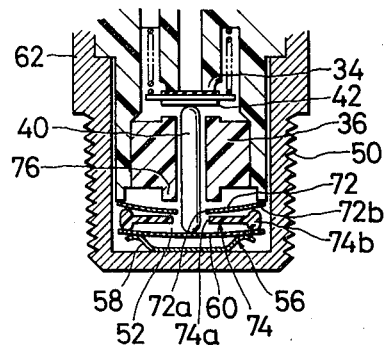
FIG. 3 is a similar view to FIG. 2 showing the same part of the valve as FIG. 2 in a different mode of operation.

The length of pin 40, the length of bushing 36 and the length of snaps of both bimetallic elements are coordinated such that when bimetallic assembly is in the above first, second, or third position, valve member 42 is in seated position shown in FIG. 1, disengaged position from seat 34 in FIG. 2, or again seated position as shown in FIG. 3.

Valve assembly 10 is particularly adapted to be threaded into an object, such as an automotive engine water jacket or the like, to transfer heat from the engine to bimetallic elements 60 and 72 so as to heat the elements in response to a corresponding temperature increase of the engine. Upon cooling of the engine, the elements will also be maintained at approximately the temperature of the engine.

When valve assembly 10 is installed in a cold engine, with port 20 connected with the engine intake manifold and port 18 connected with atmosphere, bimetallic elements 60 and 72 are in the first position shown in FIG. 1 thus providing that the valve member 42 seats as shown. In this condition, input port 20 is isolated from port 18, and hence atmosphere. As the engine heats up to a predetermined higher temperature, first bimetallic element 60 snaps to an inverted dish-shaped configuration thereby providing for valve 42 to disengage from seat 34 by the spring bias of spring 44. This condition allows for air flow passage through seat 34 between both ports 18 and 20. Then as the engine heats up more to a second predetermined temperature, bimetallic element 72 also snaps to an inverted dish-shaped configuration as shown in FIG. 3 thereby providing for valve member 42 to again engage seat 34, with the result that communication between both ports 18 and 20 is again blockaded.

From the foregoing it will be understood that the vacuum pressure at the port 20 is on a comparatively high level either in the first and third positions respectively shown in FIG. 1 and FIG. 3, whereas the vacuum pressure is lowered when in the second position of FIG. 2. Accordingly, the vacumm at port 20 changes in successive three steps to an increasing degree of temperature. Attainment to the series of the three positions is the very purpose of the invention and is considered to be in accord with the general intellect to decrease number of apparatuses necessary for automotive vehicles. The three step variation in vacuum pressure in the port 20 is beneficially employed for controlling a vacuum operated system, such as, for example a vehicle engine exhaust gass recirculation system. The system is required to provide a series of three modes of operation in successive steps upon an increasing degree of temperature, the first and last modes being substantially identical.

In a modification in which the port 20 is connected to an air consuming apparatus, the valve assembly 10 serves as a fluid quantity controlling or adjusting valve for a fluid flow passing therethrough in response to a varying temperature.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A thermally responsive valve assembly comprising:
   a hollow valve body having two ports;
   a valve mechanism in the body interposed between the ports and including a seat and a valve member for closing and allowing communication between the ports;
   a pair of first and second dish-shaped bimetallic elements in side by side relation with each other, said second bimetallic element having a central hole formed therein;
   a spacer member having a central hole formed therein and a bead edge, said spacer member being interposed between the first and second bimetallic elements in concentric relation with the first and second bimetallic elements;

transfer pin means operatively connecting the first bimetallic element to the valve member by freely passing through the central hole of the second bimetallic element and the central hole of the spacer member;

a first member surrounding the transfer pin means in a freely movable condition for providing an anchoring means for the second bimetallic element around the central hole of the second bimetallic element;

a second member providing a second anchoring means for the second bimetallic element outside of the first member on the same side of the second bimetallic element such that snap lengths of the first and second bimetallic elements cancel each other at a predetermined temperature to thereby provide a series of closed, opened and again closed positions of the valve mechanism in successive steps upon an increasing degree of temperature wherein said valve body includes a first valve member having a single common cavity formed therein in which the first and second bimetallic elements are disposed for maintaining alignment of the assembly, said second bimetallic element is movable in said cavity, and said spacer member is movable in conformity with snap over operation of said first and second bimetallic elements; and resilient means for resiliently supporting the first bimetallic element, interposed between the first bimetallic element and a wall portion of the first valve body part wherein the first valve body part further comprises a first valve body part of thermally conductive material and further comprises a wall portion exposed to ambient temperature and an externally threaded portion for being screwed into a tapped bore for installation and wherein the valve body further comprises a second valve body part and wherein the second valve body part further comprises a glass fiber filled nylon and having said two ports formed therein as a unit, the first valve body part having said cavity formed therein adjacent to an end portion of the first valve body part, and wherein said second valve body part further comprises a bushing member anchored therein by press fitting, the bushing member forming said first anchoring means in a face portion thereof adjacent the second bimetallic element at a peripheral edge portion thereof.

2. A thermally responsive valve assembly as set forth in claim 1, wherein said bushing member has a central axis bore formed therein, said single transfer pin being loosely fitted in the central axis bore, and said first member being positioned at an outlet portion of the central axial bore adjacent the second bimetallic element.

* * * * *